United States Patent

[11] 3,598,164

[72] Inventor George S. August
    9225 Colesville Road, Silver Spring, Md. 20910
[21] Appl. No. 832,891
[22] Filed June 13, 1969
[45] Patented Aug. 10, 1971

[54] CUTTING BOARD WITH IMPROVED RESERVOIR
    8 Claims, 7 Drawing Figs.
[52] U.S. Cl. ..................................................... 146/215
[51] Int. Cl. ..................................................... A47j 47/00
[50] Field of Search ........................................... 146/215

[56] References Cited
UNITED STATES PATENTS
1,403,883  1/1922  Woods ........................... 146/215
2,609,024  9/1952  Russ ............................... 146/215
2,796,902  6/1957  Mercury ......................... 146/215

OTHER REFERENCES
Popular Mechanics, Feb. 1958, page 130, copy in class 146, subclass 215.

Primary Examiner—Willie G. Abercrombie
Attorneys—William D. Hall, Elliott I. Pollock, Fred C. Philpitt, George Vande Sande, Charles F. Steininger and Robert R. Priddy ABSTRACT: A carving or cutting board is provided with an inclined upper surface, an aperture in said inclined surface, and a relatively large serving receptacle removably attached to the underside of the cutting board below said aperture for accumulating liquids or cut materials.

PATENTED AUG 10 1971 3,598,164
SHEET 1 OF 2
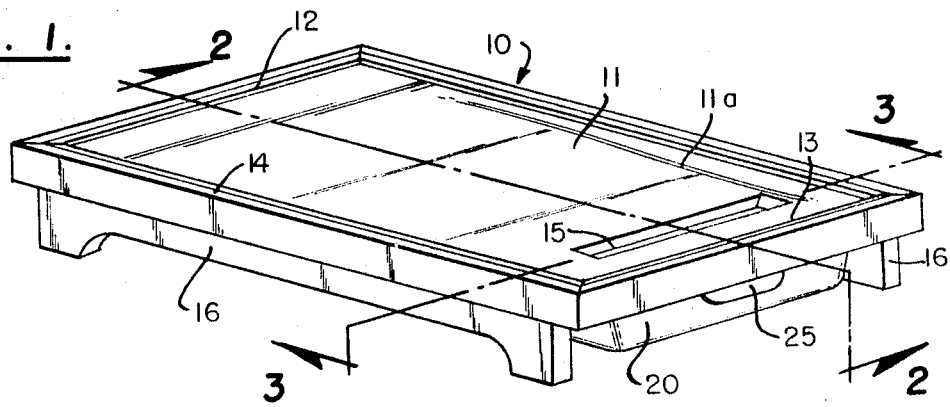
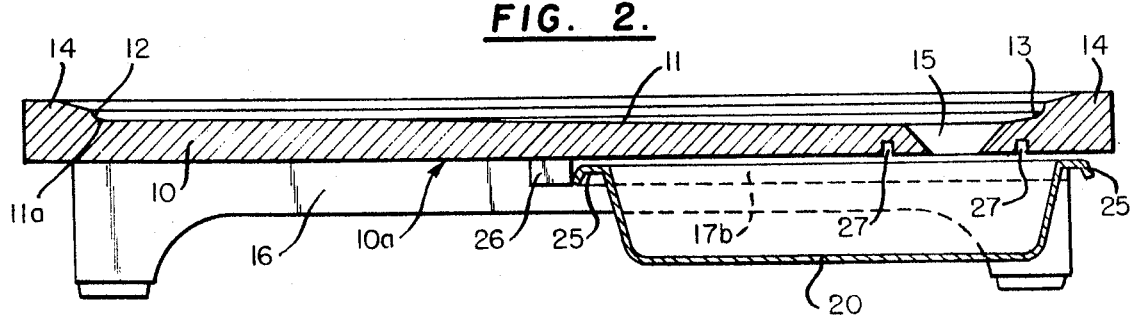
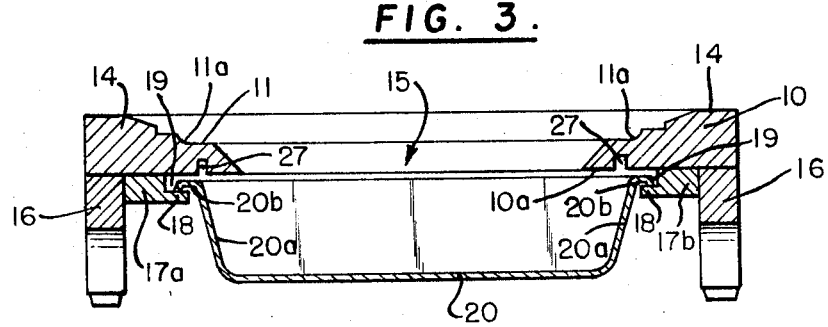
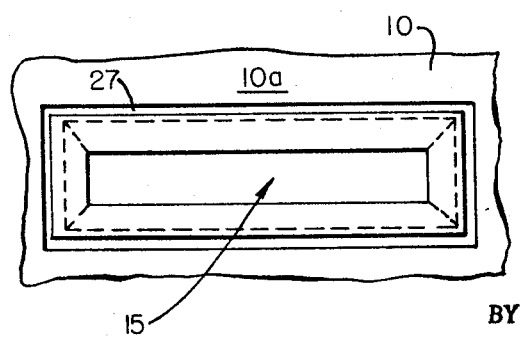
INVENTOR
George S. August
BY
ATTORNEY

PATENTED AUG 10 1971

INVENTOR
George S. August

BY

ATTORNEY

CUTTING BOARD WITH IMPROVED RESERVOIR

BACKGROUND OF THE INVENTION

Various forms of carving or cutting boards have been suggested heretofore for cutting meats or the like. It has generally been recognized heretofore that, during carving operations, juices, gravy and the like will flow onto the cutting surface; and it is customary, therefore, for carving boards to be provided with a well or reservoir into which liquids may drain and be collected. In general, the well is relatively shallow, and is formed integrally with the remainder of the board. Typical examples of this may be found in U.S. Pats. No. 1,038,647 to Pitt; No. 1,365,147 to Berwick; No. 2,751,951 to Strathaus; and, No. 2,942,639 to Margolis.

Carving boards constructed in the manner described above are relatively inconvenient to use. The collection well is generally of extremely limited capacity and, as a result, often fills and overflows onto the cutting surface or underlying table long before the cutting operation itself has been completed. In addition, since the collection receptacle is fashioned as an integral portion of the board, it is very difficult and messy to remove the collected liquid from the carving board for serving or storage purposes.

In an effort to remedy some of the difficulties which have been experienced due to the limited capacity and integral nature of the reception well, alternative suggestions have been made wherein a carving assembly is provided with a carving surface which is somehow separable from an enlarged collection receptacle. Arrangements of this type are shown, for example, in the U.S. Pats. No. 2,866,556 to Hinz and No. 2,963,957 to Tashman. These alternative suggestions suffer from the disadvantage however, that the collection receptacle ordinarily constitutes a supporting structure for the carving or cutting surface; and accordingly it is not possible to separate the collection receptacle from the carving surface, for serving or storage of liquids, without at the same time incapacitating the carving surface for continued carving operations. In addition, the form of receptacles which are employed in these alternative arrangements do not lend themselves to use as serving or storage containers whereby, when serving or storage of the collected liquids is desired, such liquids must ordinarily be transferred to another container with resultant possibility of spillage and the like.

The present invention, recognizing these difficulties, is concerned with a highly improved carving or cutting board assembly having a collection receptacle of enlarged size adapted for ready removal and replacement when desired, the receptacle being so fashioned that it may be directly used for the serving or storage of liquids, and being so mounted in conjunction with the cutting surface of the assembly that the overall assembly is highly attractive and is in no way impaired or disabled by removal of the drainage receptacle.

SUMMARY OF THE INVENTION

In accordance with the present invention, a carving or cutting board is provided, fabricated of wood, appropriate plastic or the like. The cutting board is associated with supporting means comprising legs directly attached to the board, or a supporting frame in which the board can be removably placed. By this arrangement, support of the board is rendered entirely independent of any requirements for liquid collection.

The cutting board is provided with an inclined upper cutting surface, and one or more drainage apertures extend through the board adjacent a lower end of the inclined cutting surface, preferably at a position inward of the lowermost end of said cutting surface. A storage receptacle, sized to retain up to a pint or more of liquid, is removably attached to the underside of the cutting board underlying the drainage aperture (s) and in spaced relation to the supporting legs or frame of the entire assembly. The receptacle preferably comprises a flat-bottomed, stainless steel pan having a protruding side rim slidably retained in complementary, laterally spaced grooves formed on the underside of the board, and so positioned relative to the outer edges of the board that, when the receptacle is slid in place, it is essentially hidden from view and completely covered by the board itself.

Juices or other liquid experience gravity flow toward and through the drainage aperture (s) into the underlying receptacle. The receptacle can be quickly removed for direct use in serving or storing the accumulated liquids, and replaced by a substitute receptacle to permit a carving or cutting operation to continue without delay. In addition, due to the convenient manner in which the various parts can be disassembled, the cutting board, supporting structure, and collection receptacle can be more readily and thoroughly cleaned, e.g., in an automatic dishwasher. The thorough cleanability of the structure is enhanced by the provision of a recess formed in the underside of the cutting board in surrounding relation to the drainage aperture or apertures, and operative to restrict the accumulation of grease on the underside of the board.

BRIEF DESCRIPTION OF THE DRAWINGS

FIG. 1 is a perspective view of a cutting board constructed in accordance with one embodiment of the present invention;

FIG. 2 is a cross-sectional view taken on line 2—2 of FIG. 1;

FIG. 3 is a cross-sectional view taken on line 3—3 of FIG. 1;

FIG. 4 is a detail view of a portion of the underside of the board;

DESCRIPTION OF THE PREFERRED EMBODIMENTS

Figure 5:
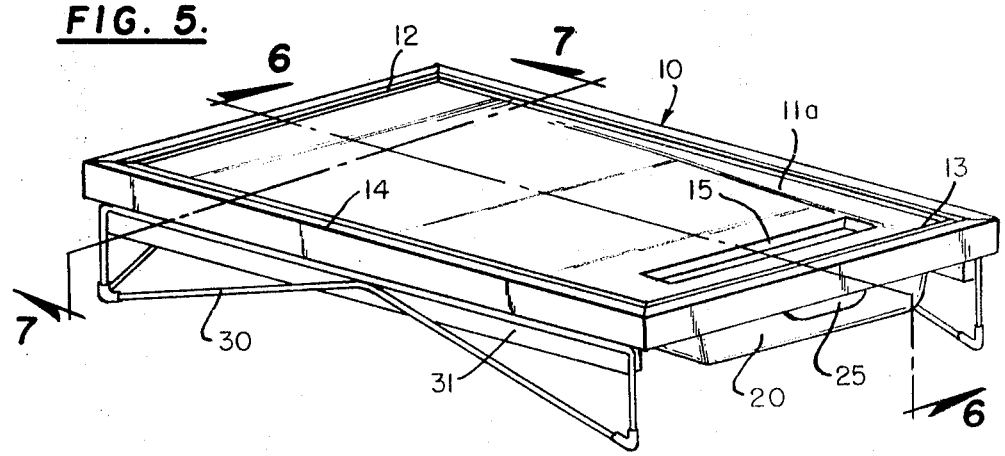
FIG. 5 is a perspective view of an alternative form of the invention.

Referring initially to Figures 1 through 4 inclusive, like numerals of which refer to like parts throughout, it will be seen that a cutting board constructed in accordance with the present invention may comprise a main board structure 10 fabricated of wood, plastic or the like. It must be understood in this respect that the term "board" as used herein is not intended to limit the materials which can be employed in practice of the present invention, and any appropriate material my be employed. Board 10 is provided with an upper cutting surface 11 which is preferably slightly inclined downward from the rear end 12 of the board toward the forward end 13 thereof.

Cutting surface 11 can be provided with integral or removable sharp-pointed prongs appropriately spaced from one another to assist in retaining a piece of meat or the like in place; and, in addition, surface 11 can, if desired, be provided with drainage grooves for directing the flow of liquid toward the forward end of the board. These additional features are, however, optional. In the preferred form of the invention shown in the drawings, such features are intentionally eliminated so that the main surface of the board is essentially flat and uninterrupted to facilitate use of the board not only for meat carving purposes but also, when desired, for other cutting or slicing operations, e.g., to cut vegetables or prepare salads.

The upper surface of board 10 is smoothly contoured or curved adjacent all edges of the cutting surface 11, as at 11a, to confine articles being carved or cut, and juices, to cutting surface 11 itself; and, in addition, the edges of cutting surface 11 are preferably surrounded by an upstanding rim 14 which assists in such confinement. As a result of this overall arrangement, any juices which may be produced during a carving operation tend to be confined to the region defined by cutting surface 11 itself, and tend to flow under the influence of gravity toward the forward edge 13 of the board 10.

Board 10 is provided with a relatively large elongated slot or aperture 15 adjacent the lowermost end of inclined cutting surface 11, at a position spaced inwardly of and extending generally parallel to the forward end 13 of the board. Aperture 15 is provided for drainage purposes and could, to this effect, take the form of a plurality of spaced, smaller apertures. However, the single elongated aperture 15 shown in the drawings is preferred since it facilitates use of the board during salad preparation, e.g., cut vegetables can be manually scraped into aperture 15 and will readily pass therethrough when it is of the elongated enlarged configuration shown. All edges of slot 15 are preferably inclined or beveled as shown to assist in the drainage of liquids or passage of materials therethrough, and the contours of the board surface adjacent all edges of aperture 15 are such as to direct liquid flow toward said inclined slot edges from all directions.

Board 10, in the embodiment shown in Figures 1—3, is provided with a supporting structure comprising leg members 16 integral with the board itself and positioned to space the under surface 10a of the board a significant distance above the underlying table upon which the board is to be used. The underside 10a of the board is further provided with a reservoir supporting structure comprising a pair of elongated supporting members 17a and 17b laterally spaced from one another and having lips 18 extending toward one another in spaced relation to the underside 10a of the board 10 so as to define elongated shoulders or grooves 19 adapted to slidably receive and retain in place portions of a storage or serving receptacle 20.

Receptacle 20 preferably comprises a flat-bottomed stainless steel pan sized to retain at least a pint of liquid, and shaped so that it can be used not only as a drainage receptacle but can also be used directly for serving or storage purposes. In the form shown in the drawings, pan 20 is substantially rectangular in configuration, but other shapes may be employed, e.g., circular, oval, etc. The flat bottom of the pan is preferably formed with integral upstanding slightly inclined sides 20a having uppermost edges which are directed outwardly to define a rim 20b extending along each side of the pan 20 and arranged to overlie flanges 18 in the region of grooves 19 of the supporting structure. The dimensions of the sides 20a of the pan are so chosen relative to the height of legs 16 that, when rims 20b are located in supporting grooves 19, the bottom of the pan 20 is freely spaced above the underlying table. As a result of these dimensional considerations, pan 20 can be readily slidably displaced relative to grooves 19 in drawerlike fashion to achieve attachment and detachment of the collection receptacle 20 relative to the underside 10a of the cutting board.

To facilitate slidable movement of the receptacle 20 relative to cutting board 10, the opposing ends of receptacle 20 are provided with handle portions 25. The pan is entirely symmetrical, and either such handle may be disposed adjacent the forward end of the board for manually sliding receptacle 20 into or out of grooves 19. The other handle, which is then disposed rearwardly of the first-mentioned handle, acts as an abutment cooperating with a stop member 26 comprising a block of material attached to and extending across the board underside to limit the rearwardmost position of the receptacle 20. The position of stop member 26 is determined, of course, by the length of receptacle 20; and this position should be so chosen that receptacle 20, when fully inserted in place, is completely covered by the board, is positioned below drainage aperture 15, and has its forward handle 25 positioned inwardly of the frontmost edge of the board as best shown in FIG. 2.

It has been found that, as liquids flow and drip through board drainage apertures such as 15, grease tends to congeal and collect on the underside of the board. During an extended cutting operation, the congealed grease tends to spread over a relatively large surface area of the board underside; and this tends to make cleaning of the board rather difficult. In accordance with the present invention, the underside 10a of the board is provided with a recess or groove 27 which completely surrounds all edges of slot 15 (see especially FIG. 4) and which serves to confine the accumulation of grease to a relatively small area between the lower edges of slot 15 and groove 27. This feature, coupled with the ready manner in which the board and collection receptacle can be disassembled from one another, permits all parts of the structure to be quickly and thoroughly cleaned when desired.

Figure 6:
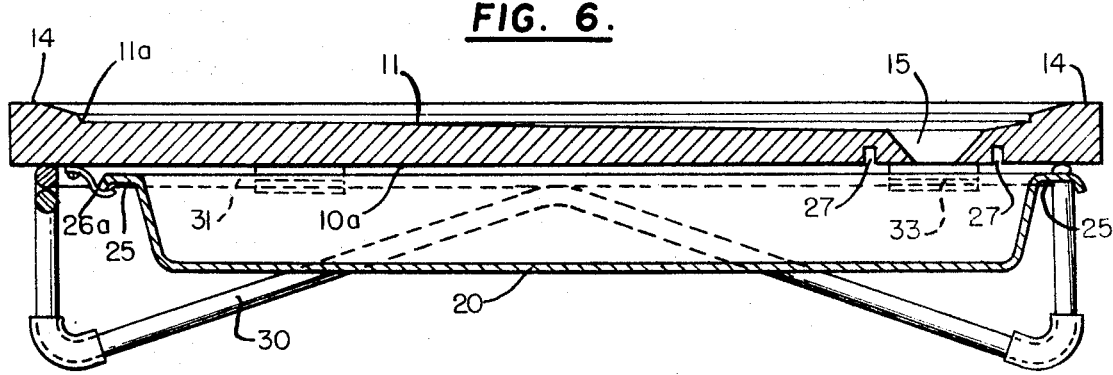
FIG. 6 is a cross-sectional view taken on line 6—6 of FIG. 5.
Figure 7:
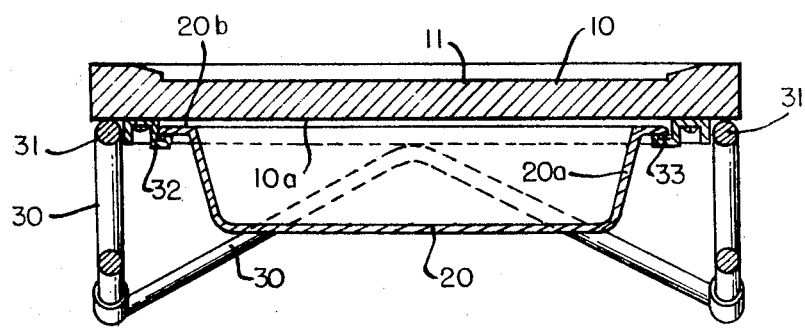
FIG. 7 is a cross-sectional view taken on line 7—7 of FIG. 5.

Various modifications can be made in the structure of FIGS. 1 through 4, and certain of these modifications have already been described. Additional possible modifications are shown in FIGS. 5 through 7; and, to the extend that parts of the embodiment shown in these latter figures correspond to those already described, like numerals have been employed. It must be understood that the various additional modifications shown in FIGS. 5 through 7 can be incorporated individually or in any combination with one another, in a structure of the type shown in FIGS. 1 through 4, and vice versa.

As shown in FIGS. 5 through 7, the pan 20, rather than having a length underlying only approximately one-half of the board 10, can be made substantially longer so as to be substantially coextensive in dimension with the entire underside 10a of the board; and, to this effect, the stop member corresponding to element 26 can be disposed adjacent the rearward end of the board as at 26a. Moreover, stop member 26a, rather than comprising a block as in FIGS. 1—4, can comprise a stainless steel clip attached to the underside of the board and adapted to resiliently engage the rearward handle 25 of pan 20 to limit the rearward position of the pan and hold it in place.

In addition, rather than providing integral legs of the type shown in FIGS. 1—3, the board can be provided with a separate supporting frame 30 fabricated of metal, wood, or plastic into which board 10 may be removably placed. In the particular form of the invention shown in FIGS. 5 through 7, the supporting frame 30 is illustrated as of chromium-plated wire construction and is fashioned in a three-sided or U-shaped configuration extending along the two side edges and the rear edge of board 10. The board can be provided with a depending flange 31 of U-configuration adapted to engage frame 30 to hold the board in place relative to frame 30. It will be appreciated, however, that this particular frame and supporting configuration is merely illustrative, and other separable supporting arrangements can be used if desired.

As a further modification, supporting members 17a and 17b (FIGS. 2 and 3) can be replaced by a pair of stainless steel clips 32 and 33 attached to the underside of the board or to the frame 30, and providing flanges or support shoulders analogous in function to element 18 for slidably engaging rims 20b of the pan 20. As shown in FIG. 6, clips 32 and 33 are relatively short in length and are positioned adjacent the forward end of the board on either side of slot 15. However, the clips 32 and 33 may be positioned elsewhere along the board underside, and may be supplemented by additional such clips spaced from one another, to achieve the desired pan supporting function. The use of clips 26a, 32, and 33 in place of the block structures of FIGS. 1—4, makes it somewhat easier to clean the overall structure.

Having thus described my invention, I claim:

1. A cutting board assembly comprising a board member having an upper cutting surface; an elongated slot in said cutting surface extending through said board member, said cutting surface being inclined toward said slot, a recess in the underside of said board member surrounding the lower edges of said slot for confining any spread of grease to a region on the underside of said board closely adjacent to the lower edges of said slot, means adjacent the underside of said board member providing a pair of support shoulders laterally spaced from one another and positioned in spaced relation to the underside of said board member, a removable collection receptacle positioned below said slot, said collection receptacle comprising a flat-bottomed pan including upstanding sides having integral outstanding projecting portions engaging and overlying said shoulders in slidable relation to said shoulders and to underside of said board member, and means for supporting said board member on a table with the bottom of said pan being freely spaced above said table when said projecting portions are in slidable engagement with said shoulders.

2. The assembly of claim 1 including handle means on said collection receptacle for facilitating slidable displacement of said receptacle relative to the underside of said board member.

3. The assembly of claim 2 including a stop member adjacent the underside of said board member for limiting slidable movement of said receptacle in at least one direction of such movement.

4. The assembly of claim 1 wherein said means for supporting said board member comprises leg members integral with said board member.

5. The assembly of claim 1 wherein said means for supporting said board member comprises a supporting frame separable from said board member.

6. The assembly of claim 1 wherein said means providing said support shoulders comprise a pair of elongated structural members integral with the underside of said board member and defining a pair of elongated supporting grooves extending in spaced substantially parallel relation to one another.

7. The assembly of claim 6 wherein said pan is of substantially rectangular configuration, said outstanding projecting portions comprising rims extending along the uppermost edges of a pair of elongated substantially parallel sides of said pan for slidable insertion respectively into said pair of elongated supporting grooves, and handle means at both opposing ends of said pan.

8. The assembly of claim 7 wherein the dimensions of said substantially rectangular pan are substantially coextensive with the dimensions of the underside of said board member.